Figure 1:
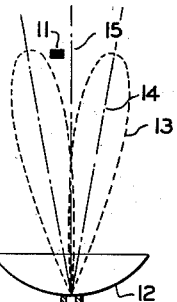

March 9, 1948.  M. K. WITT  2,437,286
RADAR DEVICE
Filed Aug. 17, 1943

INVENTOR
MARCUS K. WITT
BY
ATTORNEY

Patented Mar. 9, 1948

2,437,286

UNITED STATES PATENT OFFICE 2,437,286

RADAR DEVICE

Marcus K. Witt, Hempstead, N. Y., assignor to The Sperry Corporation, a corporation of Delaware Application August 17, 1943, Serial No. 498,929

11 Claims. (Cl. 250—160)

My invention relates to indicating devices in general, and more particularly to cathode-ray tube indicators.

As an essential part of a conical scan, microwave radio object locator system, an indicator must be provided which will enable the operator to direct the transmission of radio waves toward the object to be detected in such a manner that the axis of rotation of the transmitted wave pattern is pointing directly toward the target.

This indicator must therefore register the relative position of the target with respect to such axis in order that the operator may physically move the transmitting antenna in azimuth and elevation until the axis of rotation of the wave pattern is brought into alignment with the target and thereafter to maintain this alignment by "tracking the target."

In present systems it is common practice to employ two instruments known to the art as "tracking indicators," one for azimuth and one for elevation indication. The first of these instruments indicates whether the axis of rotation of the wave pattern is to the right or left of the target, and the second whether it is above or below the object. Each instrument indicates what is termed in the art as "error."

Thus, if the axis of rotation of the wave pattern is to the right or left of the target, the azimuth tracking indicator will indicate right or left error as the case may be, and if above or below the target, the elevation tracking indicator will register a vertical error with reference to a zero point. The transmitting antenna is then physically oriented with respect to the target until both indicators are in zero registry and the system is said to be "on" the target.

It is with indicating apparatus such as that described that my invention deals, and, while the indicator forming the subject matter of the present application is not limited to employment in any particular type of apparatus or system, it is particularly useful as a tracking indicator and accordingly will be described in connection with a radio object locator system.

Since all radio object locator systems are dependent upon the reception of reflected radio signals, their receiving apparatus is subject to random fluctuations, or noise, which, in the case of prior art, causes tracking indicators to give an indication of error, from noise, that is not distinguishable from that produced by a true signal.

These instruments employ a pointer which is responsive to a voltage that varies about a reference point in accordance with the amount of error received in the system. Thus, if the pointer is made to operate at a vertical position for zero error, it may, in the case of azimuth indication, be deflected to the left to indicate left error and to the right to indicate right error. Responsive to random fluctuations, or noise, the instrument pointer may therefore be caused to fluctuate from right to left, giving the operator a false indication and thereby causing him to attempt to track a target by making adjustments to the movable antenna to the right or left. If under these circumstances the locator system is being used to supply a computer with data for the purpose of laying guns or directing searchlights, the computer is constantly being supplied with extraneous data.

Prior indicating mechanisms make no provision for informing the operator that the object being tracked is passing through a series of changes in attitude. For different attitudes of the object, such as an airplane, different reflecting surfaces are presented and as a result signals of varying strength are deflected and received by the detector system which are in turn transmitted to the indicating device. These signals, due to their rapidly changing strength, produce error indications which cause the operator to attempt the tracking of a target prematurely, or prior to the time it has assumed a steady course and is in a proper attitude for tracking.

Since the sensitivity of these instruments changes with signal strength, they are also subject to fading, and under such conditions the indicator pointers thereof are caused to oscillate with changes in signal strength even though the error is actually constant, thus falsely indicating that the error is changing.

Prior art instruments also make no provision for indicating signal strength, and accordingly afford the operator no choice in the objects which are to be tracked. Thus, a target which is located at some distance from the transmitting station will reflect signals which are weaker than those reflected from an object within close proximity of the transmitting apparatus. Since, in prior art instruments, relative signal strength is not indicated, it is impossible for the operator to distinguish between near and distant objects, and no selection of the target can be made. This is, of course, a marked disadvantage in locating hostile aircraft, since no means is provided to tell the operator that a plane is approaching in close proximity to the transmitting system or at some distance from it. He may therefore, erroneously track a distant object when he should be tracking an object closer to the detector system.

It is accordingly an object of my invention to provide an improved tracking indicator which will eliminate the disadvantages described above with respect to prior art apparatus.

It is also an object of my invention to provide a cathode ray tube indicator capable of indicating error and relative signal strength, simultaneously.

It is another object of my invention to provide a cathode ray tube indicator for a radio detector system which will enable the operator to distinguish between close targets and distant objects.

As another object of my invention I wish to provide a cathode ray tube indicator for radio detecting systems which will not give a false indication of error.

Yet another object of my invention is to provide an indicating device which is responsive to two voltages, one proportional to signal strength and the other proportional to the error voltage of a radio detector system.

Still another object of my invention is to provide an indicator which is responsive to a signal, but whose sensitivity is independent of signal strength.

Other objects and advantages of my invention will become apparent as the description proceeds.

In carrying out my invention in a preferred embodiment thereof, and in connection with its application to a radio detector system, I provide an electronic circuit comprising two channels in which voltages are produced for delivery to the vertical and horizontal deflecting plates of a cathode ray tube upon whose screen is projected the desired indication.

Within the first channel I utilize a voltage produced in the automatic volume control circuit of the system's receiver which is proportional to signal height. This voltage modulates a reference voltage of constant frequency to produce an alternating voltage whose amplitude is a function of the strength of the signals received by the system. The alternating voltage thus produced is in turn amplified in a deflection amplifier, connected for push-pull operation, one element of which is biased in such a manner as to cause the amplifier to act as a half-wave rectifier, thereby preventing the negative half cycle of the vertical deflecting plate voltage from having any deflecting effect on the cathode ray beam.

In the other channel of the circuit a voltage from the system's phase detector, sometimes referred to as a phase-sensitive amplifier modulates a portion of the reference voltage utilized in channel 1 to produce a reference voltage which is in phase opposition with the reference voltage at its source. By means of a balancing potentiometer these reference voltages are balanced so that when the phase-sensitive amplifier of the system is sending out a zero error signal, no alternating current voltage is passed. In this manner an alternating voltage is produced which is in phase, or in phase opposition, with the reference voltage, depending upon the variation of the voltage received from the phase-sensitive amplifier about its zero error reference point. This voltage is delivered to a deflecting amplifier which is connected for balanced push-pull operation. The output of the deflecting amplifier is then taken to the horizontal plates of the cathode ray tube which is used as the indicator.

Under the influence of the voltages produced in the two channels of the circuit, the cathode ray beam of the cathode ray tube is caused to project a vertical straight line on the cathode ray tube screen for zero error indication (zero horizontal deflecting voltage) whose length is proportional to signal strength.

Likewise the voltage impressed upon the horizontal deflecting plates of the cathode-ray tube, causes this line to veer to the right or the left for right or left error indication, and pivots it about a point which is determined by the level fixed by the bias point of one element of the vertical deflecting amplifier.

The grid of the cathode ray tube is biased from the reference voltage source to prevent a "foot," in the form of a horizontal line, from appearing as a part of the indication which is due to the half cycle of the horizontal deflecting voltage which operates during the time that the negative half cycle of the vertical deflecting voltage is cut off.

Thus, a straight vertical line is produced on the tube's screen as a zero error indication which tilts to the right or left about a pivot point to give right or left error indication or, in the case of use as an elevation indicator, an above or below indication.

In all instances for constant error, the length of the line on the cathode ray tube is proportional to signal strength since the vertical and horizontal component of the deflecting voltage is a function of signal level. When no signals are being received by the system the line diminishes to a spot, and when a target is being tracked which is rapidly changing its attitude, the length of the line changes rapidly due to rapid change in signal strength. However, the angular displacement remains constant for constant error.

Figure 2:
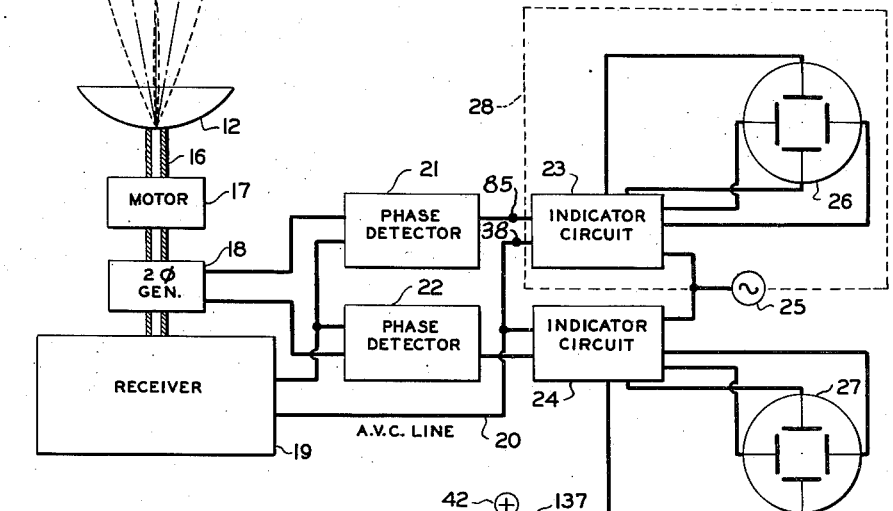
Figure 2:
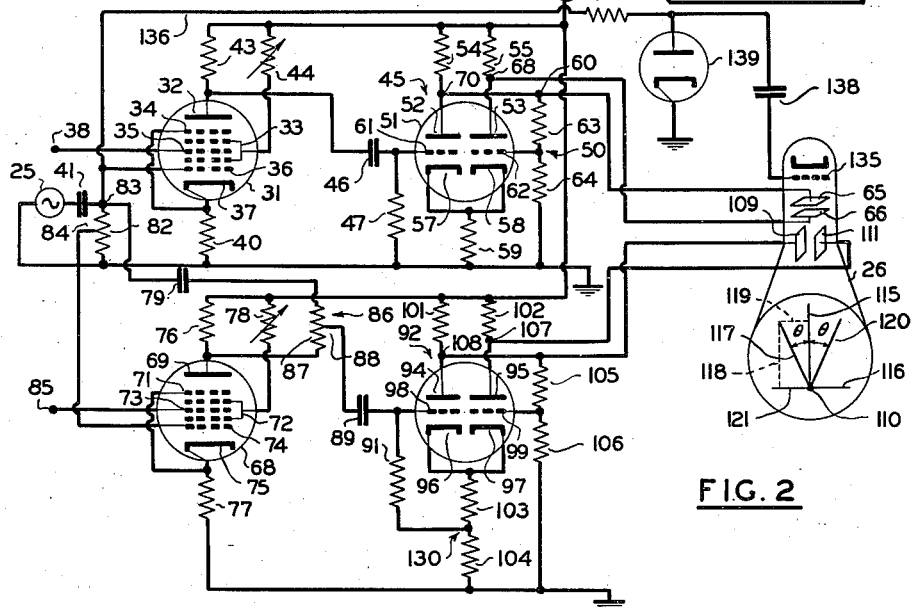

A more comprehensive understanding of my invention will be afforded by the following detailed description when taken together with the accompanying drawing, in which like reference numerals have been used throughout to designate like parts, and in which Fig. 1 is a schematic block diagram of a radio locating system in connection with which the invention of the present application is employed; and Fig. 2 is a schematic diagram of an embodiment of my invention.

In the radio locator system illustrated in Fig. 1, an area in which an object 11 is located, is scanned by a radio beam having a lobe 13 and center line 14 which is rotated about an axis 15. This scanning beam is produced by revolving a parabolic reflector 12, carrying a dipole antenna, (not shown) through a shaft 16 with a motor 17 which is mechanically connected to a two-phase generator 18. Signals reflected from the target 11 are received by the same antenna from which transmission is made and conducted to the receiver 19 wherein they are filtered in a circuit responsive to the received signal's modulation frequency, equal to the spin frequency of parabolic reflector 12. Then within an azimuth phase detector 21 and an elevation phase detector 22, the filtered signals are compared respectively with one phase of the output of the two-phase generator 18, to produce an error voltage for delivery to my improved indicating device 28, comprising indicator circuit 23 and cathode ray tube 26, in the case of azimuth indication, and to the indicator circuit 24 and cathode ray tube 27 in the case of elevation indication.

To the indicator circuits, only one of which will be described, there is also delivered a signal amplitude responsive voltage, which is taken from the automatic volume control circuit of receiver 19 by a line 20, and an alternating voltage of reference character from alternating current source 25. These voltages are acted upon within the circuit in the manner which will now be described in connection with the embodiment of my invention illustrated in Fig. 2, for delivery of the horizontal and vertical deflection plates of the cathode ray tubes of indicators 26 and 27.

In the embodiment illustrated, a variable linear transducer 31, represented as a pentagrid mixer, is provided for modulating a reference voltage supplied from source 25, with the voltage received from the automatic volume control circuit of the receiver 19.

Element 31 has a plate 32, a screen 33, a suppressor 34, a first control grid 35, a second control grid 36, and a cathode 37. The circuit is provided with an input terminal 38 from which point the voltage from the automatic voltage control circuit is supplied to the control grid 35. The reference voltage is impressed upon the second control grid 36 from source 25 through coupling capacitor 41. The plate of this element is connected to positive energy source 42 through suitable connections and plate resistor 43. Suppressor 34 and cathode 37, are tied together and the latter connected to ground through cathode resistor 40. Energy is supplied to screen 33 of this element through variable resistor 44. The output of modulator 31 is taken from the plate circuit thereof and supplied to a deflecting amplifier 45 through the coupling elements 46 and 47. As a result of the variable potential applied to grid 35 by the automatic volume control voltage line 20 from receiver 19, the alternating voltage output of element 31 represents a version of the alternating voltage signal from source 25 of amplitude dependent on the strength of the signals received by receiver 19.

Deflecting amplifier 45, illustrated as a double triode, is connected to operate in push-pull fashion. The output of modulator 31 is received in the left half of the tube and is impressed on control grid 61 thereof. Plates 52 and 53 are connected to positive energy source 42 through the plate resistors 54 and 55, respectively. Cathodes 57 and 58 are tied together and are connected to ground through the common cathode resistor 59. Grid 62 of the right half of the tube is connected to a voltage divider 50 comprising the resistors 63 and 64 and is connected to plate 52 through resistor 63 and the connections 60 and 70.

Voltage divider 50 performs the function of dividing the alternating output voltage taken from plate 52 at 70 for appliction of a portion thereof to the grid 62 of the right half of the tube, for push-pull operation.

Such an arrangement corresponds generally to well known dual-triode phase-inverter circuits for producing push-pull outputs with an unbalanced excitation input circuit.

The output of the amplifier 45 is taken from the points 68 and 70 and delivered to the vertical deflecting plates 66 and 65 of the cathode ray tube 26.

A second channel of the circuit is provided which consists of a variable linear transducer 68 having the usual electrodes 69, 71, 72, 73, 74 and 75, which are connected generally as are those of element 31, through a plate resistor 76, a cathode resistor 77 and a variable resistor 78. A second input terminal 85 for the circuit receives the output of the phase detector 21 and delivers the same to control grid 73 of modulator 68. A portion of the reference voltage supplied from source 25 to the first channel is taken from the point 83 through potentiometer 82 having an arm 84, and delivered to control grid 74 of mixer 68. Although illustrated as a potentiometer, the resistance comprising the portion of the winding of potentiometer 82 may, if desired, be a fixed resistor of suitable value to give proper balance of the reference voltages appearing at arm 88.

For adding the reference voltage which is taken from plate 69 of element 68 with the reference voltage from source 25, which is 180° out of phase therewith, a balancing potentiometer 86 is provided having a winding 87 connected in series with these two sources through a direct-current blocking condenser 79. Arm 88 of potentiometer 86 is adjusted to provide a balance between the output of element 68 and that of the substantially constant amplitude source 25, such that for zero error the A. C. output taken at arm 88 is equal to zero. When this balanced condition is disturbed, as explained below, an A. C. voltage is supplied to deflecting amplifier 92 through coupling elements 89 and 91.

As signals are received on input terminal 85 from phase detector 21, which fluctuate about a reference point in accordance with right or left error, an A. C. voltage is delivered to grid 98 of deflecting amplifier 92, which is in phase, or 180° out of phase, with the reference voltage supplied from source 25. This voltage is then amplified in deflecting amplifier 92 and delivered to horizontal deflecting plates 109 and 111 of cathode ray tube 26.

Deflecting amplifier 92, although connected for push-pull operation, differs from amplifier 45 in that it is balanced and neither half of the tube is biased to cut-off. Plates 94 and 95 are connected to positive source 42 through plate resistors 101 and 102, and cathodes 96 and 97 to ground through series resistors 103 and 104 of voltage divider 130. Resistors 103 and 104 of divider 130, and 105 and 106 of divider 131, are of such value that grids 98 and 99 will be maintained at the same direct-current potential above ground and that the signal received by grid 99 will be at the same level as that received by grid 98. Thus, tube 92 and associated circuits constitute a second dual-triode phase inverter for balanced output from an unbalanced input.

Through the conventional operation of mixer 31, the voltage received from the automatic volume control circuit of receiver 19 on input terminal 38 modulates the constant frequency, constant amplitude reference voltage from source 25. Inasmuch as the A. V. C. voltage varies in accordance with the strength of the signals received by the system, an A. C. voltage is developed in the plate circuit of this tube whose amplitude is a function of signal strength.

With no signal impressed on deflecting amplifier 45, the grid biases are arranged so that the first half of the tube is just within the non-conducting region. At the same time energy from source 42 is divided by resistors 54, 63 and 64 to maintain grid 62 at a point above ground such that the right half of the tube is conducting. Under the influence of current flow between plate 53 and cathode 58 of the right half of the tube, a voltage drop is maintained across the common cathode resistor 59 which maintains cathode 58 and, incidentally, cathode 57 which is tide thereto, at a point above ground such that the left half of the tube is biased to "plate current cut-off."

When a signal is received on grid 61, and under the influence of the positive half cycle thereof, the left half of the tube is rendered conducting and delivers to grid 62 an inverted half wave which, through the voltage divider 50, is equal in amplitude to that received by grid 61. During the negative half cycle of the input voltage to grid 61 the left half of the tube is driven farther into the non-conducting region, and accordingly no signal is passed to the right half of the tube.

In this manner deflecting amplifier 45 delivers to the vertical deflecting plates 65 and 66 of cathode ray tube 26 a deflecting voltage which is effective only during the positive half cycle of the input voltage on grid 61.

The reference voltage supplied from source 25 is modulated in the mixing element 68 with the error voltage taken from the phase sensitive amplifier 21 and delivered to terminal 85. An A. C. voltage is thus developed in the plate circuit of this tube whose amplitude is determined by the level of the voltage on input terminal 85. This A. C. voltage in the plate circuit of element 68, which is in phase opposition with that of source 25, is balanced therewith by means of a potentiometer 86 so that no A. C. voltage appears on grid 98 of amplifier 92 at a time when the voltage on grid 73 of mixer 68 is at zero error level.

As the voltage on grid 73 fluctuates above or below zero error level, depending, in the case of azimuth tracking, on whether right or left error signals are being received by receiver 19, an A. C. voltage will appear on grid 98 of horizontal deflecting amplifier 92 which is in phase, or in phase opposition, with the reference voltage 25. This voltage is then amplified by balanced amplifier 92 which operates in conventional push-pull manner for delivery to horizontal deflecting plates 109 and 111 of cathode ray tube 26.

It is apparent therefore that for a zero error indication, that is, when no reference voltage is passed through amplifier 92, the cathode beam of tube 26 will be deflected in a vertical line 115 by the vertical deflecting voltage received on plates 65 and 66. Since this voltage varies in accordance with the strength of the signals received by the system, the length of line 115 is an indication of relative signal strength.

For weak signals the line is shorter than will appear for strong signals. This holds true for patterns indicating right or left error since the vertical component of an indication, such as 118 for indication 117, varies in accordance with signal strength and the horizontal component 119 also varies in accordance with the average level of the received signals. When the received signal vanishes the line indication contracts to a spot at point 110 which is fixed to correspond with that produced by the biasing voltage on cathode 57 of amplifier 45.

When the circuit receives an error signal on input terminal 85 corresponding to right error, a voltage is delivered to the horizontal deflecting plates 109 and 111 which produces an indication such as line 120 at an angle of θ with the vertical axis proportional to the inverse tangent of the error voltage. In like manner, when a left error signal is received, a voltage is applied to the horizontal deflecting plates which is in phase opposition to that for a right error indication, and a line indication 117 is produced to the left of the vertical, or zero error, line which also make an angle θ therewith, also proportional to the inverse tangent of the error voltage. In either case the line indication is caused to pivot about the point 110, below which no vertical deflecting voltage is applied due to the rectifying action of vertical deflecting amplifier 45.

Simultaneously with the indications of right and left error produced by the operation of the circuit thus far discussed, a "foot" will appear as a part of the indication. For a left error indication this foot will appear as a line, such as 116, and for a right error indication such as a line 121, each of which is attributable to the following action of the circuit.

Under the influence of the voltage appearing on the vertical plates of the cathode ray tube, the beam thereof is caused to be deflected upward for the first quarter cycle thereof and downward during the next quarter cycle. Since deflecting amplifier 45 is biased to cut-off, the negative half of this cycle does not produce any deflecting force on the beam, and the indication such as line 115 is caused to terminate at point 110. During the next positive half cycle, the vertical deflection is repeated. If at the same instant of time, a left error indication is received on the input terminal 85 of the horizontal deflecting channel of the circuit, the cathode-ray beam will be caused to be deflected to the left. If the two deflecting signals be considered as starting together at zero time reference, the beam will be deflected upward during the first quarter cycle of the vertical deflecting voltage and to the left under the influence of the cophasal first quarter cycle of the horizontal deflecting voltage, which will cause an indication such as line 117 to appear on the screen of the tube. During the next quarter cycle of both horizontal and vertical voltages, the line will be retraced, and thereafter, as stated before, since the amplifier for the vertical deflection voltage is biased to cut-off, the beam will not be further acted upon by the vertical deflecting voltage during the negative half cycle of the vertical deflecting voltage. However, during the positive half cycle of the horizontal voltage, the beam will be deflected to the right, causing a foot such as the line 116 to appear on the screen.

Since the output of horizontal deflecting amplifier 92 for a right error signal is 180° out of phase with that for a left signal, a similar condition will obtain during the time the circuit is receiving right error indication and a foot, 121 will appear as a part of the indication.

To remove this portion of the indication, bias is supplied to grid 135 of cathode ray tube 26 from reference voltage source 25, through conductor 136, resistor 137, and coupling condenser 138. Unilateral current conducting element 139 acts as a switch to pass the positive half-cycle of the reference voltage to ground. Since the reference voltage supplied from source 25 is in phase relation with the output of deflecting amplifier 92, either for right or left error indication, grid 135 is biased during the half cycle of the horizontal deflecting voltage which is coincident with the negative half-cycle of the vertical deflecting voltage and accordingly the portion of the indication represented by the lines 116 and 121 is removed therefrom.

Since the cathode ray tube is instantaneously responsive to the signals received by the system illustrated in Fig. 1, and since it has no moving parts which will attempt to follow random fluctuations, or noise, it is possible for the operator to distinguish between a true signal and noise, thus avoiding erroneous indications and false tracking. Also, due to changes in the length of the indications 115, 117 or 120, it is possible for the observer to determine the relative strength of the signals being received and in turn to determine the relative distance of the target from the detector system. In a similar manner it is possible for the observer to note the changes in attitude that the target may be assuming and to delay his tracking operation until the reflected signal is of constant strength. Also, since the lines produced for right or left error are made up of vertical and horizontal components which vary equally with signal strength, the direction of the line indication on the fluorescent screen remains approximately uniform for a constant error indication, although the strength of the error signal is changing. Thus the angular sensitivity of the indicator is not changed appreciably by fading, the only result being a change in the length of the visible line forming the indication.

From the foregoing description of my invention, it is readily seen that an indicating device is provided for showing, in a single visible line representation, directional information as well as signal strength information. The angular displacement of the visible line indication from a reference position on the device is used for directional information, while the length of the visible line is varied in accordance with the strength of the received signals.

In the embodiment shown and described, a cathode-ray oscilloscope is employed as an indicating device for a radio object detection system. The "vertical" deflection plates of the cathode-ray tube serve as means for deflecting the cathode-ray electron stream in a first direction, while the "horizontal" deflection plates of the cathode-ray tube serve as means for deflecting the electron stream in a second direction, which usually is substantially perpendicular to the first direction. Circuit means including an alternating current source, a mixer and an amplifier are provided for applying to the "vertical" deflection plates, a first alternating voltage the amplitude of which increases with rising strength of received radio signals to be indicated, and decreases as the received signal strength diminishes.

To the "horizontal" deflection plates of the cathode-ray tube is applied a second variable amplitude alternating voltage of a particular phase relation with respect to the voltage applied to the vertical deflection plates. This second voltage also is varied in accordance with the strength of the received signals, as explained above. Along with this variation, due to signal strength variation, there is a further variation of the second alternating voltage in accordance with the error or disagreement of directions between the directional scanning axis of the radio object detector and the actual direction of the detected object.

By virtue of this latter variation of the second alternating voltage, the visible line presented on the cathode-ray tube is made to shift angularly in accordance with an error in the scanner alignment with respect to the target. By virtue of the simultaneous variations of the first alternating voltage and the second alternating voltage due to variations of received signal strength, the line indication presented on the cathode-ray tube is extended or compressed, without appreciable change of direction.

Thus, in the use of the indicating device of the present invention, the operator is enabled to interpret fully the operation of the radio direction responsive system, both as to the strength of received signals and the direction from which the signals are received. A single line pattern indicates strength of the signals according to the length of the line, and received signal direction according to the orientation of the line on the indicating device.

Modifications of my invention are, of course, possible and may present themselves in view of the foregoing disclosure and description, and accordingly the representations and illustrations here made are to be taken as illustrative only and not in a restricted sense, and my invention is to be considered as of such breadth as is defined by the appended claims.

What is claimed is:

1. In a tracking indicator, means responsive to a signal for producing an angularly movable error indicating line, and means for controlling the visible length of said line to indicate signal strength.

2. In combination with a radio detector system having a radio receiver, an indicator comprising means responsive to a signal produced in said receiver for producing an angularly movable visible line for directional error indication, and means responsive to the signal intensity in said receiver for controlling the length of said error indicating line to indicate received signal strength.

3. Apparatus for simultaneously indicating the signal strength and the direction of reception of radio signals received through a direction-detecting receiver, comprising an indicating device providing a visible line, means for positionally deflecting said line in accordance with the direction of reception of radio energy by said receiver, and means for varying the length of said line in accordance with the strength of said received radio energy.

4. A cathode ray signal strength and orientation indicating instrument comprising a cathode ray tube having a fluorescent screen and an electron gun for projecting a stream of electrons against said screen to produce a visible pattern thereon, first voltage-responsive means for deflecting said electron stream in a first direction, further voltage-responsive means for deflecting said electron stream in a second direction, means for applying a first alternating voltage to said first deflection means for deflecting said electron beam back and forth for extending said pattern into a visible line on said screen, means for applying a second alternating signal of predetermined phase relation with said first signal to said further deflecting means for causing said line to shift angularly on said screen in accordance with the strength of said second alternating voltage relative to the strength of said first alternating voltage, and means for simultaneously varying the amplitudes of said first and second alternating signals alike, whereby the length of said line is varied for signal strength indication.

5. In combination with a radio object detection device including a periodically moving scanning antenna and a radio receiver coupled thereto for detecting energy received from an object and producing an alternating output signal therefrom having a phase relation with said scanning movement indicative of the direction of a detected object, the indicating apparatus comprising an indicating device adapted to produce a movable visible line, means responsive to the output phase of said receiver for varying the orientation of said line on said device in accordance with the position of a detected object in relation to said scanning antenna, and means responsive to the signal strength of signals received from said detected object for varying the apparent length of said visible line in accordance with the strength of said received signal.

6. In combination, a movable directive antenna for radiating energy to and receiving energy from distant objects, motive means for periodically varying the direction of maximum energy transfer of said antenna, a first reference generator coupled to said antenna and said motive means for producing an alternating reference signal, a receiver coupled to said antenna for detecting energy transmitted to distant objects and reflected therefrom, an indicating device for producing a visible line movable with respect to said device, means coupled to said receiver and to said indicating device and responsive to the strength of the energy detected in said receiver for varying the length of said line visible on said device, and phase detector means coupled to said receiver and said reference signal generator for comparing the phase of the output signal produced in said receiver by said detected energy with the phase of said reference generator and producing an output signal varying according to phase variations of said receiver output signal, the output of said phase detector being coupled to said indicating device for moving said line in accordance with the relative phase of said receiver output signal whereby the length and position of said line on said indicating device indicate respectively the intensity and direction on the energy received from said object.

7. Apparatus as defined in claim 6, wherein said indicating device comprises a cathode-ray oscilloscope having first and second alternating cophasal voltages applied to the respective deflection circuits thereof, for producing a visible line on the screen thereof, the length of said line being proportional to the amplitudes of both of said cophasal alternating signals, and the angular position of said line being determined by the relative amplitudes of said cophasal alternating signals.

8. A cathode-ray tube direction and amplitude indicator, comprising a cathode-ray oscilloscope embodying a fluorescent screen, an electron gun adapted to project a stream of electrons against said screen, means for deflecting said electron stream in a first direction, and means for deflecting said electron stream in a second direction, means for applying a first alternating voltage to said first deflecting means for producing visible line on said fluorescent screen, means for applying to said second deflecting means a second alternating voltage cophasal with said first voltage, means for varying the amplitude of said second alternating voltage relative to said first voltage whereby said line is made to rotate through an angle on said fluorescent screen, and means for varying similarly the amplitudes of said first and second alternating voltages for varying the length of said visible line.

9. A cathode-ray tube direction and amplitude indicator, comprising a cathode-ray oscilloscope embodying a fluorescent screen, an electron gun adapted to project a stream of electrons against said screen, means for deflecting said electron stream in a first direction, means for deflecting said electron stream in a second direction having an appreciable component perpendicular to said first direction, and means for varying the intensity of said electron stream, means for applying a first alternating voltage to said first deflecting means for producing a visible line on said screen, means for applying to said second deflecting means a second alternating voltage cophasal with said first alternating voltage, means for varying the amplitude of said second voltage relative to said first voltage whereby the angular orientation of said visible line is varied on said fluorescent screen, means for proportionately varying the amplitudes of said first and second alternating voltages for varying the length of said visible line, and means synchronized with said first alternating voltage for applying a beam intensity varying signal to said intensity, varying means during a predetermined part of each cycle of said first alternating voltage, 10. In combination with a radio receiver having a periodically movable directive antenna and adapted to receive and detect radio energy arriving from a distant object, said radio receiver being adapted to deliver an alternating output voltage varying in phase according to the periodic movement of said antenna and in amplitude according to the intensity of the radio energy received from said object, said radio receiver being adapted also to deliver a further output voltage varying as the average intensity of the radio energy received from said distant object, the indicating apparatus comprising a cathode-ray oscilloscope having two devices for mutually perpendicular deflections of the luminous trace of said cathode-ray oscilloscope, means responsive to said further output voltage for applying to one of said deflection devices an alternating voltage of amplitude varying according to the average intensity of said received radio energy, and means for applying to the other deflection device an alternating voltage of phase and amplitude varying according to the phase and amplitude of said alternating output voltage delivered by said receiver.

11. Indicating apparatus comprising, in combination with radiant energy receiving means having a directional characteristic, a cathode-ray tube including a pair of beam deflecting devices adapted to position the beam of said tube in mutually perpendicular planes for shaping the pattern of a visible trace produced by said beam on the screen of said tube, means for applying an alternating signal to one of said devices adapted to deflect said beam to produce a linear trace on said screen in one of said planes, means controlled by said receiving means responsive to the relative position of said directional characteristic with respect to a source of radiant energy for applying an alternating control signal cophasal with said first signal to the other of said devices of a magnitude dependent upon said relative position for causing deflections of said linear trace from said one plane to indicate said relative position, and means controlled by said receiving means responsive to the signal strength of energy received from said source for jointly controlling the magnitude of both of said signals according to said signal strength for causing variations in the length of said linear trace to indicate the magnitude of said signal strength.

MARCUS K. WITT.

REFERENCES CITED

The following references are of record in the file of this patent:

UNITED STATES PATENTS

| Number | Name | Date |
| --- | --- | --- |
| 2,216,707 | George | Oct. 1, 1940 |
| 2,231,929 | Lyman | Feb. 18, 1941 |
| 2,307,023 | Cooke et al. | Jan. 5, 1943 |
| 2,318,338 | Simon et al. | May 4, 1943 |

FOREIGN PATENTS

| Number | Country | Date |
| --- | --- | --- |
| 497,147 | Great Britain | Dec. 9, 1938 |